Patented Nov. 18, 1952

2,618,018

UNITED STATES PATENT OFFICE 2,618,018

TREATMENT OF FIBROUS CELLULOSE DERIVATIVES TO RENDER THEM MORE EASILY POWDERED

John Downing and James Gordon Napier Drewitt, Spondon, near Derby, England, assignors to British Celanese Limited, a corporation of Great Britain No Drawing. Application September 9, 1949, Serial No. 114,911. In Great Britain October 22, 1948

10 Claims. (Cl. 18—48)

This invention relates to the manufacture of cellulose derivatives and other film-forming substances in powderable or granular form.

Cellulose ethers and esters are made by two types of process, in one of which they are obtained in solution from which they may be precipitated, while in the other they are not dissolved but retain more or less completely the fibrous form of the cellulose from which they are made. Cellulose acetate for example is usually, though not necessarily, made by a process in which the ester as it is formed is dissolved either in acetic acid or in methylene chloride and is subsequently precipitated from the solution. Water-soluble alkyl ethers of cellulose, on the other hand, are generally made by methods which result in the ethers retaining the fibrous form of the cellulose; for example water-soluble methyl cellulose is made by the action of liquid or vaporised methyl chloride on an alkali cellulose and remains in the solid undissolved state throughout the reaction.

For certain purposes it is desirable to obtain cellulose derivatives in the form of a powder. It is found however that, when cellulose derivatives retaining the fibrous form of the cellulose are subjected to grinding by conventional means, it is extremely difficult to convert them into a granular form, the usual result of prolonged grinding being merely the formation of a finely-divided bulky product consisting mainly of short fibres and not possessing the free-flowing properties and high packing density characteristic of a truly granular material. It is an object of the present invention to provide a method whereby such substances can be converted into a form in which they can be ground to a true powder.

According to the invention, cellulose derivatives and other film-forming substances, in particular cellulose derivatives which retain partly or completely the fibrous form or structure of the cellulose from which they have been made, are subjected to a combination of heat and mechanical pressure, with or without a shearing action, such that they partly fuse or sinter but do not char. In the preferred method of doing this, the cellulose derivative or other substance is passed between closely spaced rolls, advantageously with friction at the nip. Several passages between the rolls are usually necessary, and to this end the substance may either be passed repeatedly through the nip of a single pair of rolls or it may be passed one or more times through a number of pairs of rolls; substances of high viscosity may require a longer treatment than otherwise similar substances of lower viscosity. As a result of the treatment of the invention, the film-forming substance is obtained in a brittle flake-like form which can easily be ground to a powder.

The invention is of particular value in connection with the production of granular water-soluble methyl cellulose, and for convenience it will be described in more detail by reference to this substance. Other cellulose ethers in which the fibrous form or structure of the cellulose is retained, for instance hydroxyethyl cellulose, methyl ethyl cellulose, water-soluble and other ethyl celluloses, and sodium carboxymethyl cellulose, can be converted into a readily powderable form by treatment under substantially the same conditions as water-soluble methyl cellulose; the treatment can also be given to cellulose derivatives and other film-forming substances which have not a strictly fibrous structure, though, as a rule, substances of this kind can be powdered readily enough without making use of the new process.

As already stated, in the preferred method of putting the invention into practice, fibrous methyl cellulose is passed between rolls which preferably run at different circumferential speeds. By this means the methyl cellulose is subjected to a fairly intensive shearing action as well as to mechanical pressure, in the course, and as a consequence, of which its temperature is for a short time raised sufficiently high to sinter it, with the result that the fibrous starting material is converted into a relatively brittle horn-like flake material which is readily powdered. The rolls may be such as are commonly used in working rubber; thus they may be made of cast steel or some other hard and resistant material and may be mounted in rubber-cushioned bearings; they may be arranged so that the circumferential speed of one is, for example, up to 1.3 or 1.5 times or even twice that of the other. The nip under zero load may advantageously be about 0.01–0.03 inch. If desired the rolls may be cooled, but it is usually preferable to heat them, e. g. up to 50°–100° C., and especially to about 50°–65° C.; the best temperature in any particular instance depends on the speeds of the rolls, the amount of friction developed, the width of the nip, and other factors, care being taken that the temperature of the methyl cellulose is never raised sufficiently to cause charring.

The methyl cellulose may be dried, for instance in an oven at about 50°–100° C. before being given the treatment of the invention; or it may contain its equilibrium amount of water; or it may have been wetted with water or an organic liquid. We have found that the presence of a certain amount of water, especially between about 10% and 35% on the weight of the methyl cellulose, gives an improved product and also reduces the strain on the roll bearings, and we therefore prefer to treat methyl cellulose having a moisture content within the range specified and especially about 10%-20%. Moreover the methyl cellulose may have been mixed with a softening agent or plasticiser or other substance; but any addition, e. g., a plasticiser, organic liquid or water, should of course not be in a quantity sufficient seriously to impair the sintering action of the rolls or any other device that may be employed. The methyl cellulose may if desired be preheated, e. g. to about 50°–100° C., before being passed through the rolls or given an alternative heat and mechanical pressure treatment; for example, if it has been oven-dried, it may be passed through the rolls or other device before it is allowed to cool. However the best results are usually obtained without pretreating the fibrous methyl cellulose in any way other than by adjusting its moisture content to a value within the limits specified above.

The brittle horny flake methyl cellulose obtained by the methods described can readily be pulverised, for example in a hammer mill or equivalent device or, though perhaps less economically, by continued milling on the rolls. If it is desired to obtain a mixture of granular methyl cellulose with another finely-divided substance, e. g. a white or coloured pigment or other colouring material, the said substance may, if desired, be introduced into the hammer mill together with the methyl cellulose. It is however usually preferable first to pulverise the methyl cellulose by itself and then to mix it with the pigment or other finely-divided substance in a separate operation. It is one of the advantages of the invention that the granular methyl cellulose obtainable thereby can be mixed with other dry powders much more readily and efficiently than a shredded or otherwise disintegrated fibrous methyl cellulose which has not been given the treatment of the invention.

The heat and mechanical pressure treatment, however it is carried out, may cause a certain reduction of viscosity of the methyl cellulose. In many cases this reduction will not be of importance; if it is desired to diminish or substantially prevent it, this may be done by cooling the rolls, by working in the absence of oxygen or by dispersing as thoroughly as possible in the methyl cellulose, before it is subjected to the treatment of the invention, a non-staining anti-oxidant, e. g. hydroquinone or phenyl-beta-naphthylamine; for example the methyl cellulose may be wetted with an aqueous or other solution of the anti-oxidant, the amount of water or other solvent being, of course, insufficient to interfere with the treatment.

Granular methyl cellulose obtained by the new process may have a packing density between about 0.50 and 0.58 (determined as described below). It dissolves in cold water more rapidly than does the fibrous methyl cellulose from which it has been made, even after shredding or like disintegration, and also gives clearer solutions in most instances. It is useful for many purposes for which aqueous solutions of methyl cellulose are required, and especially in the production of water-paints and like compositions and of food products, for example cream substitutes and ice cream mixes. The granular methyl cellulose is also more easily blended, packed, stored and transported than the corresponding fibrous form.

(The packing density was determined by loosely filling a 100 cc. measuring cylinder with the granular substance, dropping the cylinder 20 times through 3 inches onto rubber, and noting the final volume and the weight of the substance in the cylinder.)

Having described our invention, what we desire to secure by Letters Patent is:

1. Process for the treatment of fibrous cellulose derivatives to render them more easily powdered, which comprises raising the temperature of the fibrous material to a degree at which it sinters while remaining uncharred, at least the greater part of the necessary heat being imparted to the fibrous material by means of mechanical pressure combined with shearing action.

2. Process for the treatment of fibrous water-soluble ethers of cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action.

3. Process for the treatment of fibrous water-soluble methyl cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action.

4. Process for the treatment of fibrous cellulose derivatives to render them more easily powdered, which comprises raising the temperature of the fibrous material to a degree at which it sinters while remaining uncharred, at least the greater part of the necessary heat being imparted to the fibrous material by means of mechanical pressure combined with shearing action exerted on the material by two opposing hard cylindrical rotating surfaces having a temperature of at most 100° C.

5. Process for the treatment of fibrous water-soluble ethers of cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action exerted on the material by two opposing hard cylindrical rotating surfaces having a temperature of at most 100° C.

6. Process for the treatment of fibrous water-soluble methyl cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action exerted on the material by two opposing hard cylindrical rotating surfaces having a temperature of at most 100° C.

7. Process for the treatment of fibrous water-soluble ethers of cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action exerted on the material by two opposing hard cylindrical rotating surfaces having a temperature between 50° and 100° C.

8. Process for the treatment of fibrous water-soluble methyl cellulose to render them more easily powdered, which comprises raising the temperature of the fibrous material to a degree at which it sinters while remaining uncharred, at least the greater part of the necessary heat being imparted to the fibrous material by means of mechanical pressure combined with shearing action exerted on the material by two opposing hard cylindrical rotating surfaces having a temperature between 50° and 100° C.

9. Process according to claim 5, wherein the superficial speeds of the surfaces are in a ratio between 1:1 and 1:2.

10. Process according to claim 8, wherein the superficial speeds of the surfaces are in a ratio between 1:1 and 1:1.7.

JOHN DOWNING.
JAMES GORDON NAPIER DREWITT.

REFERENCES CITED

The following references are of record in the file of this patent:

UNITED STATES PATENTS

| Number | Name | Date |
|---|---|---|
| 417,282 | Reed | Dec. 17, 1889 |
| 1,851,008 | Hanson et al. | Mar. 29, 1932 |
| 2,130,566 | Schmidt | Sept. 20, 1938 |
| 2,288,200 | Meyer | June 30, 1942 |
| 2,331,865 | Swinehart et al. | Oct. 12, 1943 |

FOREIGN PATENTS

| Number | Country | Date |
|---|---|---|
| 495,173 | Great Britain | of 1938 |

OTHER REFERENCES

Partial Pyrolysis of Wood, by Robert W. Merritt and Alfred A. White, in Industrial and Engineering Chemistry, vol. 35, No. 3, March 1943, pages 297, 301.